(12) United States Patent
Chun et al.

(10) Patent No.: US 8,902,874 B2
(45) Date of Patent: Dec. 2, 2014

(54) SOUNDING CHANNEL APPARATUS AND METHOD

(75) Inventors: Joon Hwa Chun, Irving, TX (US); Jian Feng Kang, Beijing (CN); Shaohua Li, Beijing (CN); Zexian Li, Espoo (FI); Andrei Malkov, Muurla (FI); Xin Qi, Beijing (CN); Shu Shaw Wang, Arlington, TX (US)

(73) Assignee: Nokia Siemens Networks Oy, Espoo (FI)

( * ) Notice: Subject to any disclaimer, the term of this patent is extended or adjusted under 35 U.S.C. 154(b) by 241 days.

(21) Appl. No.: 13/125,103

(22) PCT Filed: Sep. 29, 2009

(86) PCT No.: PCT/EP2009/062571
§ 371 (c)(1),
(2), (4) Date: Jun. 30, 2011

(87) PCT Pub. No.: WO2010/046202
PCT Pub. Date: Apr. 29, 2010

(65) Prior Publication Data
US 2011/0261806 A1 Oct. 27, 2011

Related U.S. Application Data

(60) Provisional application No. 61/106,958, filed on Oct. 20, 2008.

(51) Int. Cl.
*H04B 7/216* (2006.01)
*H04W 4/00* (2009.01)
*H04L 5/00* (2006.01)

(52) U.S. Cl.
CPC ............ *H04L 5/0051* (2013.01); *H04L 5/0016* (2013.01)
USPC ............................ 370/342; 370/330; 370/252

(58) Field of Classification Search
CPC ....................................................... H04L 25/023
USPC .......................................................... 370/342
See application file for complete search history.

(56) References Cited

U.S. PATENT DOCUMENTS 5,862,489 A 1/1999 Aalto
6,445,917 B1 * 9/2002 Bark et al. ..................... 455/423
(Continued)

FOREIGN PATENT DOCUMENTS

WO 2008086110 A2 8/2007
WO 2008057836 A2 5/2008
(Continued)

OTHER PUBLICATIONS

Non-Final Office Action for U.S. Appl. No. 12/704,352, mailed on Nov. 5, 2012, 41 pages.
(Continued)

*Primary Examiner* — Noel Beharry
*Assistant Examiner* — Joe Combs
(74) *Attorney, Agent, or Firm* — Brake Hughes Bellermann LLP

(57) ABSTRACT

According to an example embodiment, a method may include allocating, within a single physical resource unit (PRU), a plurality of channel sounding groups. Wherein each channel sounding group includes a frequency-time domain code division multiplexing (CDM) allocation. The method may also include broadcasting, in a downlink direction to one or more mobile stations in a wireless network, a signal that causes the receiving mobile stations to transmit a channel sounding signal. The method may further include receiving at least one channel sounding signal from at least one of the one or more mobile stations, the channel sounding signal being received in an uplink direction via one or more channel sounding groups. And, the method may include estimating the channel quality, of the channel used by the physical resource unit, based upon the received at least one channel sounding signal.

20 Claims, 8 Drawing Sheets

(56) References Cited

U.S. PATENT DOCUMENTS

| | | | |
|---|---|---|---|
| 7,616,596 B2 | 11/2009 | Lee et al. | |
| 7,706,804 B2 | 4/2010 | Huh et al. | |
| 7,711,386 B2 | 5/2010 | Sung et al. | |
| 7,869,341 B2* | 1/2011 | Lim et al. | 370/208 |
| 8,320,267 B2* | 11/2012 | Wei et al. | 370/252 |
| 8,605,644 B2 | 12/2013 | Wang | |
| 2003/0161411 A1* | 8/2003 | McCorkle et al. | 375/295 |
| 2004/0063430 A1* | 4/2004 | Cave et al. | 455/436 |
| 2004/0092232 A1* | 5/2004 | Zeira et al. | 455/67.11 |
| 2005/0068916 A1* | 3/2005 | Jacobsen et al. | 370/328 |
| 2005/0170781 A1* | 8/2005 | Jacobsen et al. | 455/67.11 |
| 2005/0201296 A1 | 9/2005 | Vannithamby et al. | |
| 2005/0207367 A1 | 9/2005 | Onggosanusi et al. | |
| 2006/0050662 A1* | 3/2006 | Rizvi et al. | 370/320 |
| 2006/0182192 A1* | 8/2006 | Takano | 375/267 |
| 2006/0256761 A1* | 11/2006 | Meylan et al. | 370/338 |
| 2007/0036066 A1* | 2/2007 | Thomas et al. | 370/208 |
| 2007/0064669 A1* | 3/2007 | Classon et al. | 370/347 |
| 2007/0110095 A1* | 5/2007 | Attar et al. | 370/458 |
| 2007/0171808 A1* | 7/2007 | Wu et al. | 370/208 |
| 2007/0189408 A1 | 8/2007 | Waxman | |
| 2007/0248147 A1* | 10/2007 | Tiirola et al. | 375/135 |
| 2007/0291639 A1* | 12/2007 | Jacobsen et al. | 370/208 |
| 2007/0293233 A1* | 12/2007 | Inoue et al. | 455/450 |
| 2008/0019279 A1* | 1/2008 | Kim et al. | 370/241 |
| 2008/0039098 A1* | 2/2008 | Papasakellariou et al. | 455/442 |
| 2008/0051125 A1* | 2/2008 | Muharemovic et al. | 455/519 |
| 2008/0068980 A1* | 3/2008 | Lim et al. | 370/208 |
| 2008/0075036 A1* | 3/2008 | Bertrand et al. | 370/328 |
| 2008/0080472 A1* | 4/2008 | Bertrand et al. | 370/344 |
| 2008/0095223 A1* | 4/2008 | Tong et al. | 375/228 |
| 2008/0123589 A1* | 5/2008 | Lee et al. | 370/329 |
| 2008/0123601 A1 | 5/2008 | Malladi et al. | |
| 2008/0151743 A1* | 6/2008 | Tong et al. | 370/204 |
| 2008/0188260 A1* | 8/2008 | Xiao et al. | 455/522 |
| 2008/0200203 A1* | 8/2008 | Malladi et al. | 455/522 |
| 2008/0225802 A1* | 9/2008 | Sun et al. | 370/336 |
| 2008/0225823 A1* | 9/2008 | Tenny | 370/345 |
| 2008/0232240 A1* | 9/2008 | Baum et al. | 370/210 |
| 2008/0232449 A1* | 9/2008 | Khan et al. | 375/220 |
| 2008/0233966 A1 | 9/2008 | Scheim et al. | |
| 2008/0247375 A1* | 10/2008 | Muharemovic et al. | 370/344 |
| 2008/0253279 A1* | 10/2008 | Ma et al. | 370/206 |
| 2008/0268785 A1* | 10/2008 | McCoy et al. | 455/67.11 |
| 2008/0268871 A1* | 10/2008 | McCoy et al. | 455/447 |
| 2008/0273494 A1* | 11/2008 | Vook et al. | 370/330 |
| 2008/0280631 A1* | 11/2008 | Lee et al. | 455/458 |
| 2008/0280638 A1* | 11/2008 | Malladi et al. | 455/522 |
| 2008/0298502 A1* | 12/2008 | Xu et al. | 375/299 |
| 2008/0316961 A1* | 12/2008 | Bertrand et al. | 370/329 |
| 2008/0318608 A1* | 12/2008 | Inoue et al. | 455/509 |
| 2009/0016312 A1* | 1/2009 | Tao et al. | 370/344 |
| 2009/0028112 A1 | 1/2009 | Attar et al. | |
| 2009/0034636 A1* | 2/2009 | Kotecha et al. | 375/260 |
| 2009/0042558 A1* | 2/2009 | Shen et al. | 455/422.1 |
| 2009/0046570 A1* | 2/2009 | Sarkar et al. | 370/203 |
| 2009/0046573 A1* | 2/2009 | Damnjanovic | 370/216 |
| 2009/0046645 A1* | 2/2009 | Bertrand et al. | 370/329 |
| 2009/0046674 A1* | 2/2009 | Gao et al. | 370/337 |
| 2009/0054093 A1* | 2/2009 | Kim et al. | 455/500 |
| 2009/0080504 A1* | 3/2009 | Li et al. | 375/220 |
| 2009/0086648 A1* | 4/2009 | Xu et al. | 370/252 |
| 2009/0093222 A1* | 4/2009 | Sarkar | 455/115.1 |
| 2009/0110087 A1* | 4/2009 | Liu et al. | 375/260 |
| 2009/0116599 A1* | 5/2009 | McCoy | 375/362 |
| 2009/0122884 A1* | 5/2009 | Vook et al. | 375/260 |
| 2009/0154588 A1* | 6/2009 | Chen et al. | 375/267 |
| 2009/0196366 A1* | 8/2009 | Shen et al. | 375/260 |
| 2009/0219870 A1* | 9/2009 | Wengerter et al. | 370/329 |
| 2009/0245197 A1* | 10/2009 | Ma et al. | 370/330 |
| 2009/0262695 A1* | 10/2009 | Chen et al. | 370/329 |
| 2009/0274226 A1* | 11/2009 | Mondal et al. | 375/260 |
| 2009/0296563 A1* | 12/2009 | Kishiyama et al. | 370/210 |
| 2009/0316676 A1* | 12/2009 | Kolding et al. | 370/345 |
| 2009/0316811 A1* | 12/2009 | Maeda et al. | 375/260 |
| 2010/0015923 A1* | 1/2010 | Golitschek | 455/67.7 |
| 2010/0023830 A1* | 1/2010 | Wengerter et al. | 714/748 |
| 2010/0061311 A1 | 3/2010 | Wang et al. | |
| 2010/0061346 A1 | 3/2010 | Wang et al. | |
| 2010/0080187 A1* | 4/2010 | Papasakellariou et al. | 370/329 |
| 2010/0091919 A1* | 4/2010 | Xu et al. | 375/346 |
| 2010/0103902 A1* | 4/2010 | Kim et al. | 370/330 |
| 2010/0135273 A1* | 6/2010 | Kim | 370/344 |
| 2010/0202420 A1* | 8/2010 | Jersenius et al. | 370/337 |
| 2010/0208608 A1 | 8/2010 | Wang | |
| 2010/0220614 A1* | 9/2010 | Seong et al. | 370/252 |
| 2010/0220711 A1* | 9/2010 | Ishii | 370/350 |
| 2010/0273494 A1* | 10/2010 | Iwai et al. | 455/450 |
| 2010/0284353 A1* | 11/2010 | Wu et al. | 370/329 |
| 2010/0296591 A1* | 11/2010 | Xu et al. | 375/259 |
| 2011/0134747 A1* | 6/2011 | Kwon et al. | 370/208 |
| 2011/0164661 A1* | 7/2011 | Frenger et al. | 375/211 |
| 2011/0194434 A1* | 8/2011 | Meylan et al. | 370/252 |
| 2012/0002735 A1* | 1/2012 | McCoy | 375/259 |
| 2012/0082116 A1* | 4/2012 | Kwon et al. | 370/329 |
| 2012/0201165 A1* | 8/2012 | Ko et al. | 370/252 |
| 2014/0050162 A1* | 2/2014 | McCoy | 370/329 |
| 2014/0050163 A1* | 2/2014 | McCoy | 370/329 |
| 2014/0086172 A1* | 3/2014 | Kwon et al. | 370/329 |

FOREIGN PATENT DOCUMENTS

| | | |
|---|---|---|
| WO | 2008/086110 A3 | 9/2008 |
| WO | 2010/046202 A1 | 4/2010 |

OTHER PUBLICATIONS

Response to Non-Final Office Action filed for U.S. Appl. No. 12/205,663, filed Jan. 11, 2012, 19 pages.

International Preliminary Report on Patentability received for International Patent Application No. PCT/EP2009/062571, mailed on Apr. 26, 2011, 7 pages.

"MIMO", Wikipedia, the free encyclopedia, Aug. 26, 2008, 7 pages.

IEEE, "Part 16: Air Interface for Fixed Broadband Wireless Access Systems", IEEE Standard for Local and Metropolitan area Networks, IEEE Computer Society and the IEEE Microwave Theory and Techniques Society, IEEE New York, NY IEEE Std., IEEE Std 802.16-2004, Oct. 1, 2004, 893 pages.

"Proposed Text for the Draft P802.16m Amendment on the PHY Structure for UL Control", UL Control Drafting Group, IEEE 802.16 Broadband Wireless Access Working Group, IEEE C802.16m-09/XXX Jan. 2009, 65 pages.

"Walsh code", Wikipedia, the free encyclopedia, Apr. 7, 2008, 2 pages.

"WiMAX MIMO", Wikipedia, the free encyclopedia, Jul. 16, 2008, 7 pages.

Agarwal, Rajiv, et al., "Opportunistic Feedback Protocol for Achieving Sum-Capacity of the MIMO Broadcast Channel", IEEE 66th Conference on Vehicular Technology Conference, Sep. 30, 2007-Oct. 3, 2007, pp. 606-610.

Ahmadi, Sassan, et al., "Proposed 802.16m Frame Structure Baseline Content Suitable for Use in the 802.16m SDD", IEEE 802.16 Broadband Wireless Access Working Group, Mar. 3, 2008, 13 pages.

Cudak, "IEEE 802.16m System Requirements", Motorola, IEEE 802.16 Broadband Wireless Access Working Group, IEEE 802.16m-07/002r4, Oct. 19, 2007, 26 pages.

Hamiti, Shkumbin, "IEEE 802.16m System Description Document [Draft]", Nokia, IEEE 802.16 Broadband Wireless Access Working Group, IEEE 802.16m-08/003r6, Dec. 12, 2008, 163 pages.

Hsieh, et al, "Link Performance of WiMAX PUSC", IEEE Wireless Communications and Networking Conference, Motorola Inc., Mar. 31-Apr. 3, 2008, pp. 1143-1148.

"Part 11: Wireless LAN Medium Access Control (MAC) and Physical Layer (PHY) Specifications", IEEE Standard for Information Technology—Telecommunications and information exchange between systems—Local and metropolitan area networks—Specific requirements, IEEE Computer Society, IEEE Std. 802.11-2007, Jun. 12, 2007, pp. 1-1232.

(56) References Cited

OTHER PUBLICATIONS

"Part 16: Air Interface for Fixed and Mobile Broadband Wireless Access Systems", Amendment 2: Physical and Medium Access Control Layers for Combined Fixed and Mobile Operation in Licensed Bands and Corrigendum 1, EEE Computer Society and the IEEE Microwave Theory and Techniques Society, IEEE Std. 802.16e 2005, Feb. 28, 2006, pp. 1-864.

Kang, Tae-Sung, et al., "Opportunistic Feedback Assisted Scheduling and Resource Allocation in OFDMA Systems", 10th IEEE Singapore International Conference on Communication systems, ICCS 2006, Oct. 2006, 5 pages.

Murias, Ron, "IEEE 802.16m Amendment Working Document", InterDigital Communications, LLC, IEEE 802.16 Broadband Wireless Access Working Group, IEEE 802.16m-08/050, Dec. 11, 2008, 31 pages.

Sutskover, Ilan, et al., "PN Sequences for Uplink Channel Sounding for TDD OFDMA", IEEE 802.16 Broadband Wireless Access Working Group, Intel Corporation, Aug. 27, 2004, 4 pages.

Vook, et al., "Uplink Channel Sounding for Enabling Closed-Loop Transmit Antenna Array Techniques in IEEE 802.22", Motorola Labs, IEEE 802.22-06/0012r0, IEEE P802.22 Wireless RANs, Jan. 18, 2006, pp. 1-14.

Vook, et al, "Details of UL Channel Sounding Design for Section 11.9 of the SDD", IEEE 802.16 Broadband Wireless Access Working Group, IEEE 802.16m-08/943, Sep. 5, 2008, 12 pages.

"UL RS structure Issues with Frequency Domain CDM", Qualcomm Europe, 3GPP TSG-RAN WG1 #47-bis, R1-070432, Jan. 15-19, 2007, Sorrento, Italy, 10 pages.

"Considerations and Recommendations for UL Soundings RS", Motorola, 3GPP TSG RAN WG1 #49bis, Orlando, USA, Jun. 25-29, 2007, 6 pages.

"CDM RS for Demodulation and Channel Sounding", Qualcomm Europe, 3GPP TSG RAN1 #48bis, R1-071299, Mar. 26-30, 2007, St. Julian's, Malta, 7 pages.

PCT Search Report for PCT Application No. PCT/EP2009/062571, mailed Jan. 21, 2010, 3 pages.

Non-Final Office Action for U.S. Appl. No. 12/205,663, mailed on Jul. 11, 2011, 14 pages.

Non-Final Office Action for U.S. Appl. No. 12/211,289, mailed on Aug. 22, 2011, 37 pages.

Final Office Action for U.S. Appl. No. 12/704,352 mailed May 15, 2013, 17 pages.

Notice of Allowance for U.S. Appl. No. 12/704,352, dated Sep. 25, 2013, 7 pages.

\* cited by examiner

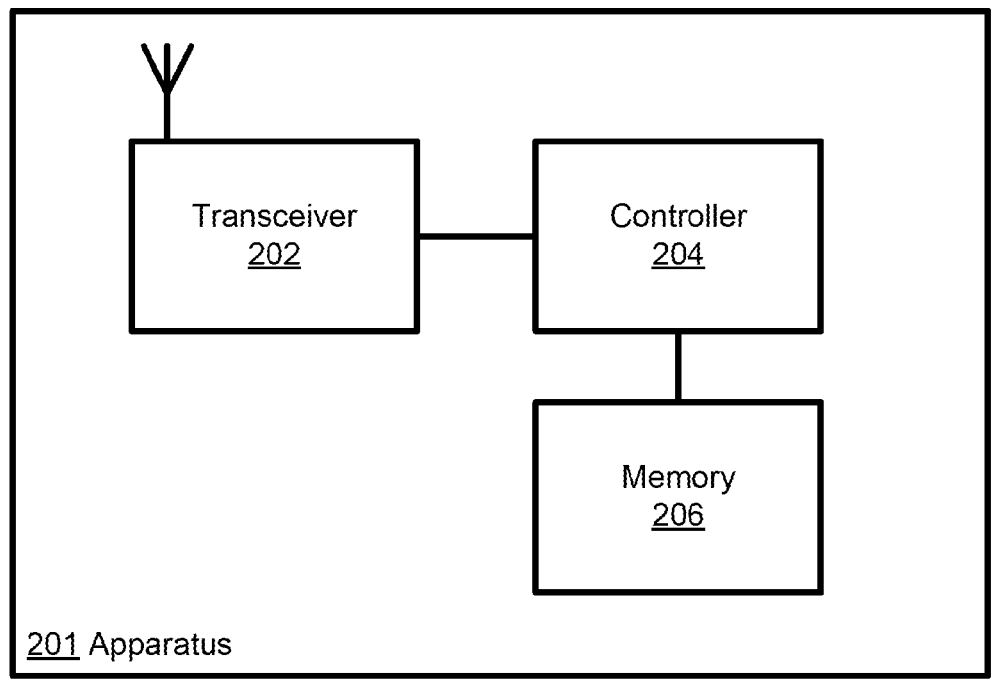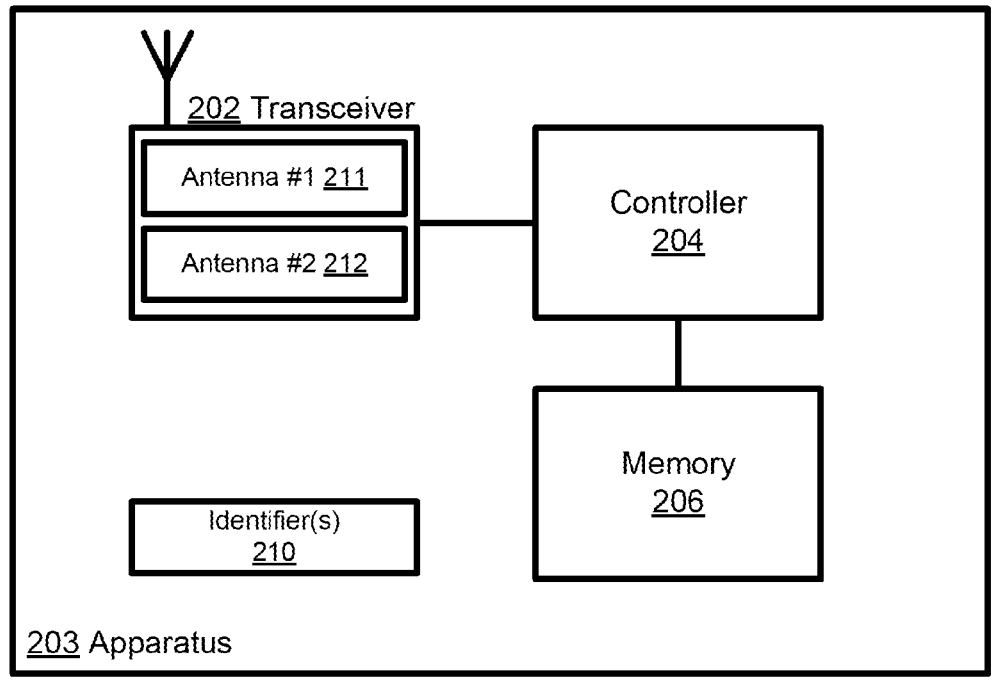
FIG. 2

Start

↓

802 Receiving, in a downlink direction, an identification code

↓

804 Receiving, in a downlink direction, an allocation, within a single physical resource unit (PRU), of a plurality of channel sounding groups

↓

806 Broadcasting a channel sounding signal in an uplink direction via one or more channel sounding groups.

↓

End

US 8,902,874 B2

SOUNDING CHANNEL APPARATUS AND METHOD

PRIORITY CLAIM

This application is a national stage entry of PCT Application No. PCT/EP2009/062571, filed on Sep. 29, 2009, entitled "Sounding Channel Apparatus and Method", which, in turn, claims the benefit of priority based on U.S. Provisional Application No. 61/106,958, filed on Oct. 20, 2008, entitled "Sounding Channel Apparatus and Method", the disclosures of which are hereby incorporated by reference in their entirety.

TECHNICAL FIELD

This description relates to communications, and more specifically to the feedback of communication channel condition information and the allocation of resources based, in part, upon the information feedback.

BACKGROUND

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, IEEE Standard for Local and Metropolitan Area Networks, Part 16, IEEE Std. 802.16-2004.

One particular derivative of the 802.16 standard is the 802.16m standard that attempts to increase the data rate of wireless transmissions to 1 Gbps while maintaining backwards compatibility with older networks. IEEE 802.16 Broadband Wireless Access Working Group, IEEE 802.16m System Requirements, Oct. 19, 2007.

Wireless Local Area Network (WLAN) is a telecommunications technology often aimed at providing wireless data over shorter distances (e.g., meters or tens of meters) in a variety of ways, from point-to-point links to full mobile cellular type access. A network based upon the WLAN standard is occasionally also referred to by the common or marketing name "WiFi" (or "Wi-Fi") from Wireless Fidelity; although it is understood that WLAN may include other shorter ranged technologies. WiFi often includes a network that is substantially in compliance with the IEEE 802.11 standards, their derivatives, or predecessors (hereafter, "the 802.11 standard"). Institute of Electrical and Electronics Engineers, IEEE Standard for Information Technology—Telecommunications and Information Exchange between Systems—Local and Metropolitan Area Network—Specific Requirements—Part 11: Wireless LAN Medium Access Control (MAC) and Physical Layer (PHY) Specifications, IEEE Std. 802.11-2007.

Multiple-input and multiple-output (MIMO), is generally the use of multiple antennas at both a transmitter and a receiver to improve communication performance. It is often considered one of several forms of smart antenna technology. MIMO technology frequently offers significant increases, compared to single input/output technology, in data throughput and link range without additional bandwidth or transmit power. MIMO systems generally achieve this by higher spectral efficiency (e.g., more bits per second per hertz of bandwidth) and link reliability or diversity (e.g., reduced fading). In general, Close Loop (CL) multi-user (MU) MIMO systems require feedback of communications channel information from all the active users. The feedback overhead however, often decreases the efficiency of the MU-MIMO system capacity.

A frequent cellular network implementation may have multiple antennas at a base station (BS) and a single antenna on the mobile station (MS). In such an embodiment, the cost of the mobile radio may be minimized. As the costs for radio frequency (RF) components in mobile station are reduced, second antennas in mobile device may become more common. Multiple mobile device antennas may currently be used in Wi-Fi technology (e.g., IEEE 802.11n).

SUMMARY

According to one general aspect, a method may include allocating, within a single physical resource unit (PRU), a plurality of channel sounding groups. Wherein each channel sounding group includes both a frequency division multiplexing (FDM) allocation and a code division multiplexing (CDM) allocation. The method may also include broadcasting, in a downlink direction to one or more mobile stations in a wireless network, a signal that causes the receiving mobile stations to transmit a channel sounding signal. The method may further include receiving at least one channel sounding signal from at least one of the one or more mobile stations, the channel sounding signal being received in an uplink direction via one or more channel sounding groups. And, the method may include estimating the channel quality, of the channel used by the physical resource unit, based upon the received at least one channel sounding signal.

According to another example embodiment, an apparatus may include a transceiver, and a controller. In various embodiments, the apparatus may be configured to allocate, within a single physical resource unit (PRU), a plurality of channel sounding groups. Wherein each channel sounding group includes both a frequency-time domain allocation and a code domain allocation. In some embodiments, the apparatus may also be configured to broadcast, in a downlink direction to one or more mobile stations in a wireless network, a signal that causes the receiving mobile stations to transmit a channel sounding signal. In various embodiments, the apparatus may also be configured to receive at least one channel sounding signal from at least one of the one or more mobile stations, the channel sounding signal being received in an uplink direction via one or more channel sounding groups. And, in one embodiment, the apparatus may also be configured to estimate the channel quality, of the channel used by the entire physical resource unit, based upon the received at least one channel sounding signal.

According to another example embodiment, a method may include receiving, in a downlink direction, an allocation, within a single physical resource unit (PRU), of a plurality of channel sounding groups. Wherein each channel sounding group includes both a frequency division multiplexing (FDM) allocation and a code division multiplexing (CDM) allocation. The method may also include broadcasting a channel sounding signal in an uplink direction via one or more channel sounding groups.

According to another example embodiment, an apparatus may include a transceiver, and a controller. In various embodiments, the apparatus may be configured to receive, in a downlink direction, an allocation, within a single physical resource unit (PRU), of a plurality of channel sounding groups. Wherein each channel sounding group includes both a frequency division multiplexing (FDM) allocation and a code division multiplexing (CDM) allocation. The apparatus may also be configured to, in various embodiments, broadcast a channel sounding signal in an uplink direction via the allocated channel sounding groups.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 2 is a block diagram of an example embodiment of an apparatus in accordance with the disclosed subject matter.

FIG. 8 is a flow chart of an example embodiment of a technique in accordance with the disclosed subject matter.

DETAILED DESCRIPTION

Figure 1:
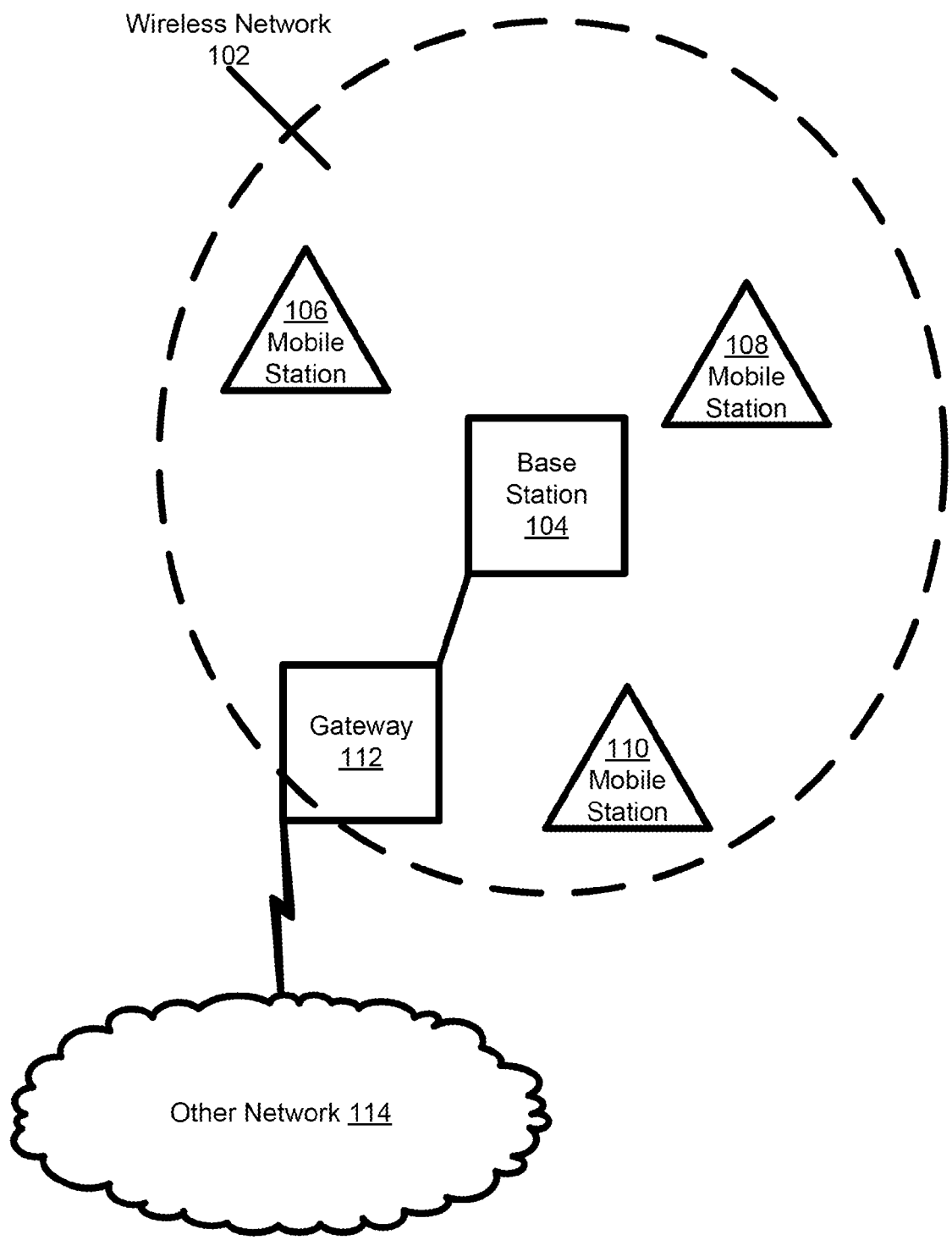
FIG. 1 is a block diagram of an example embodiment of a system in accordance with the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network, a Wide Area Network (WAN), the Internet, etc. In various embodiments, the base station 104 may be coupled or connected with the other network 120 via an access network controller (ASN) or gateway (GW) 112 that may control, monitor, or limit access to the other network.

FIG. 2 is a block diagram of two example embodiments of apparatuses 201 and 203 in accordance with the disclosed subject matter. In one embodiment, the communications device 201 may include a base station (BS) or a mobile station (MS) such as that illustrated in FIG. 1. In one embodiment, the communications device 201 may include a transceiver 202, a controller 204, and a memory 206. In some embodiments, the transceiver 202 may include a wireless transceiver configured to operate based upon a wireless networking standard (e.g., WiMAX, WiFi, WLAN, etc.). In other embodiments, the transceiver 202 may include a wired transceiver configured to operate based upon a wired networking standard (e.g., Ethernet, etc.). In various embodiments, the controller 204 may include a processor. In various embodiments, the memory 206 may include permanent (e.g., compact disc, etc.), semi-permanent (e.g., a hard drive, etc.), and/or temporary (e.g., volatile random access memory, etc.) memory. For example, some operations illustrated and/or described herein, may be performed by a controller 204, under control of software, firmware, or a combination thereof. In another example, some components illustrated and/or described herein, may be stored in memory 206.

FIG. 2 is also a block diagram of a communications device 203 in accordance with an example embodiment of the disclosed subject matter. In one embodiment, the communications device 203 may include a base station (BS) or a mobile station (MS) such as that illustrated in FIG. 1. In one embodiment, the communications device 203 may include a wireless transceiver 202, a controller 204, and a memory 206. In some embodiments, the transceiver 202 may include a wireless transceiver configured to operate based upon a wireless networking standard (e.g., WiMAX, WiFi, WLAN, etc.). In other embodiments, the transceiver 202 may include a wired transceiver configured to operate based upon a wired networking standard (e.g., Ethernet, etc.). In various embodiments, the controller 204 may include a processor. In various embodiments, the transceiver 202 may include a plurality of antennas, such as antenna #1 211 and antenna #2 212. In some embodiments, the communications device 203 may include at least one identifier 210 configured to substantially uniquely identify each antenna (e.g., antennas 211 and 212) or apparatus 203 as a whole. In various embodiments, the identifier 210 may be stored by the memory 206.

Figure 3:
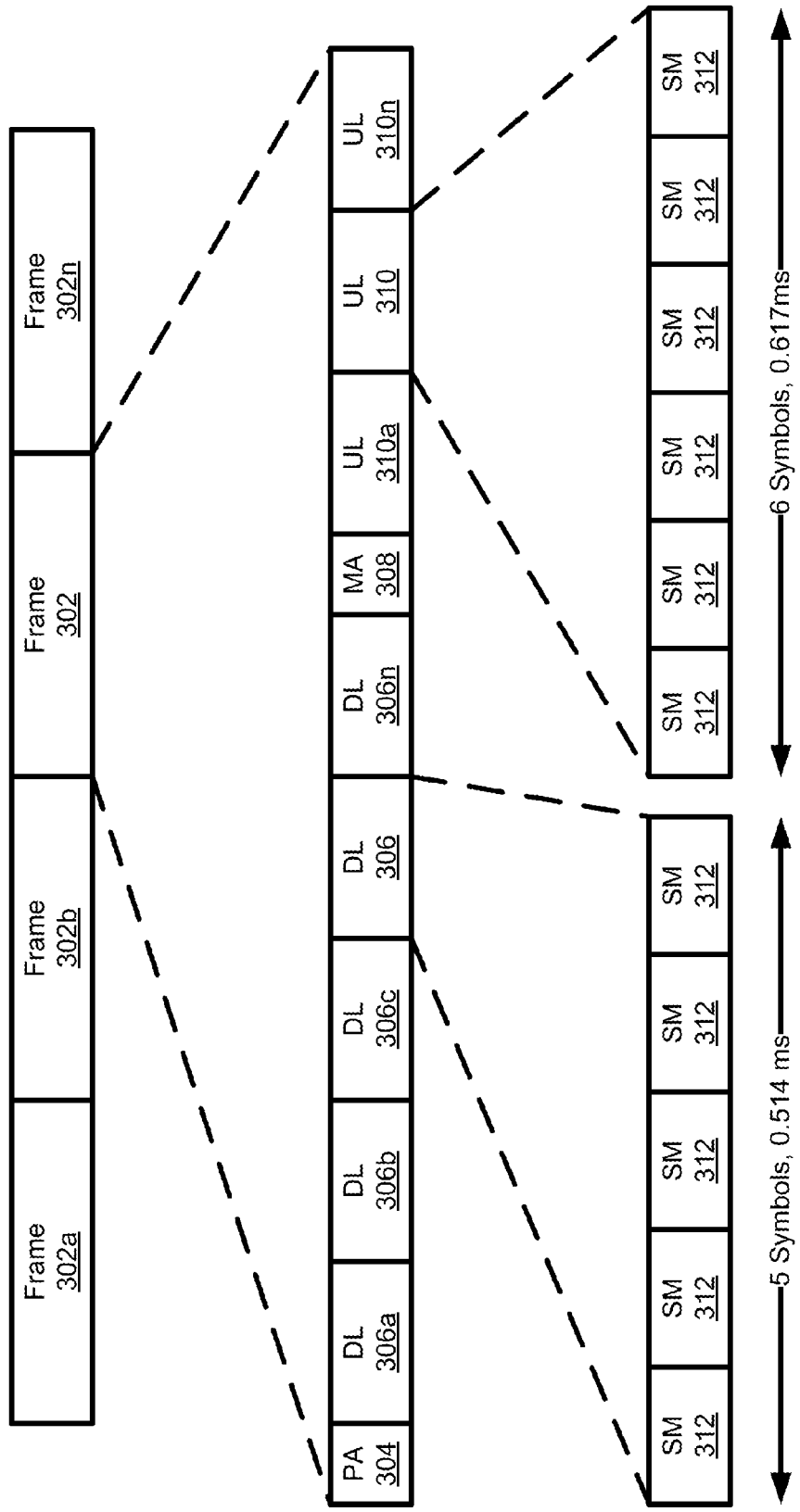
FIG. 3 is a block diagram of an example embodiment of a series of physical resource units in accordance with the disclosed subject matter.

FIG. 3 is a block diagram of an example embodiment of a series of physical resource units (grouped as, for example, frames, etc.) in accordance with the disclosed subject matter. In one embodiment, the base station and various mobile stations may communicate with each other using a series or plurality of physical resource units (PRUs) organized into frames or super-frame 300; although, it is understand that various embodiments using other communication standards may organize PRUs differently.

These PRUs may be transmitted over or via a communications channel. The following provides an overall context of the communications channel. In this context, a communications channel may include a medium used to convey information from a sender to a receiver. FIG. 3 illustrates the division of the communications channel as a function of time (e.g., time division multiplexing). In addition, a communications channel may also be divided as a function of frequency, illustrated more completely in FIGS. 4 and 5. In various embodiments, this communications channel may include a plurality of frequencies or a bandwidth of frequencies. This bandwidth may be sub-divided into sub-channels. Each of these sub-channels may include their own respective bandwidth. In various embodiments, these sub-channels may generally be of equal size.

In various embodiments, the communications channel may be divided by both time and frequency into physical resource units. In such an embodiment, a physical resource unit may include a given sub-channel or sub-channels for a period of time. These physical resource units, or a sub-division thereof, may provide the fundamental blocks of communication.

According to an example embodiment, a physical resource unit may include a group of sub-channels, such as 18 sub-channels (as an example), or any number of sub-channels.

A controlling device (e.g., a base station), in one embodiment, may allocate PRUs amongst client devices (e.g., mobile devices). In such an embodiment, the base station may attempt to perform this allocation in such a way as to reduce the number of un-received or un-usable (e.g., garbled, noise ridden, etc.) transmissions. In various embodiments, it may not be possible to make use of every possible PRU.

FIG. 3 illustrates a plurality of frames. In various embodiments, the plurality of frames may be organized into a super-frame 300. In one embodiment, this super-frame 300 may include frames 302a, 302b, 302, and 302n. Frame 302 may include a down-link (DL) portion and an uplink (UL) portion. In various embodiments, a DL sub-frame 306 may be reserved for communication from the base station to a mobile station. Conversely, an UL sub-frame 310 may be reserved for communication from the mobile station to the base station. Downlink (DL) may refer to a direction of transmission from base station to a mobile station, and uplink (UL) may refer to a direction of transmission from a mobile station to a base station.

In one embodiment, a frame 302 may include a plurality of DL sub-frames (e.g., DL sub-frames 306a, 306b, 306c, 306, and 306n) and a plurality of UL sub-frames (e.g., UL sub-frames 310a, 310, and 310n). In various embodiments, a mid-amble 308 and pre-amble 304 may, respectively, delineate the transition between the DL and UL portions of the frame 302 and between frames themselves. In one embodiment, the pre-amble 304 and mid-amble 308 may include a signal that is broadcast to any listening devices (e.g., mobile stations) within the range of the base station or other transmitting device.

Conversely, a DL sub-frame 306 or UL sub-frame 310 may include messages or signals generally intended for a specific receiver or group of receivers. Occasionally these sub-frames may be used to broadcast information (e.g., resource allocation, channel condition feedback, etc.). These time based sub-frames may be, in one embodiment, additionally divided by frequency into the PRUs (not shown) which are allocated to mobile stations to either receive or send information. In such an embodiment, the sub-frame may be the practical time division of the communications channel.

In various embodiments, the DL sub-frame 306 may include a plurality of symbols 312. In one specific embodiment, the DL sub-frame 306 may include five symbols 312 and duration of approximately 0.514 ms. In various embodiments, the UL sub-frame 310 may include a plurality of symbols 312. In one specific embodiment, the UL sub-frame 310 may include six symbols 312 and duration of approximately 0.617 ms. In various embodiments, these symbols 312 may include orthogonal frequency-division multiple access (OFDMA) symbols. In one embodiment, an UL PRU may include a bandwidth of 18 sub-channels, and a time duration or length of six symbols 312. In various embodiments, a PRU size may be configurable or predefined. It is understood that the above are merely a few illustrative examples to which the disclosed subject matter is not limited.

Figure 4:
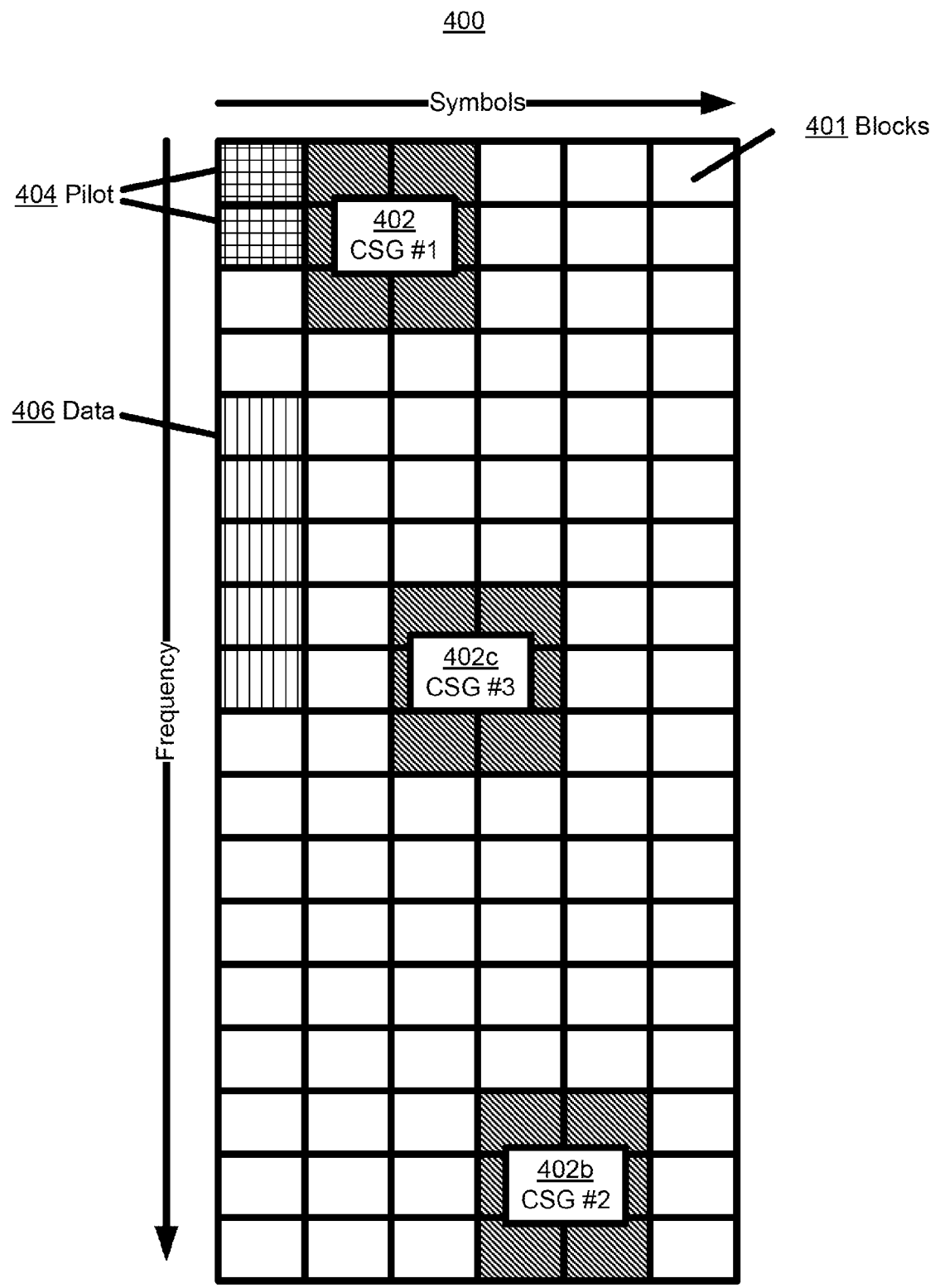
FIG. 4 is a block diagram of an example embodiment of a physical resource unit in accordance with the disclosed subject matter.
Figure 5:
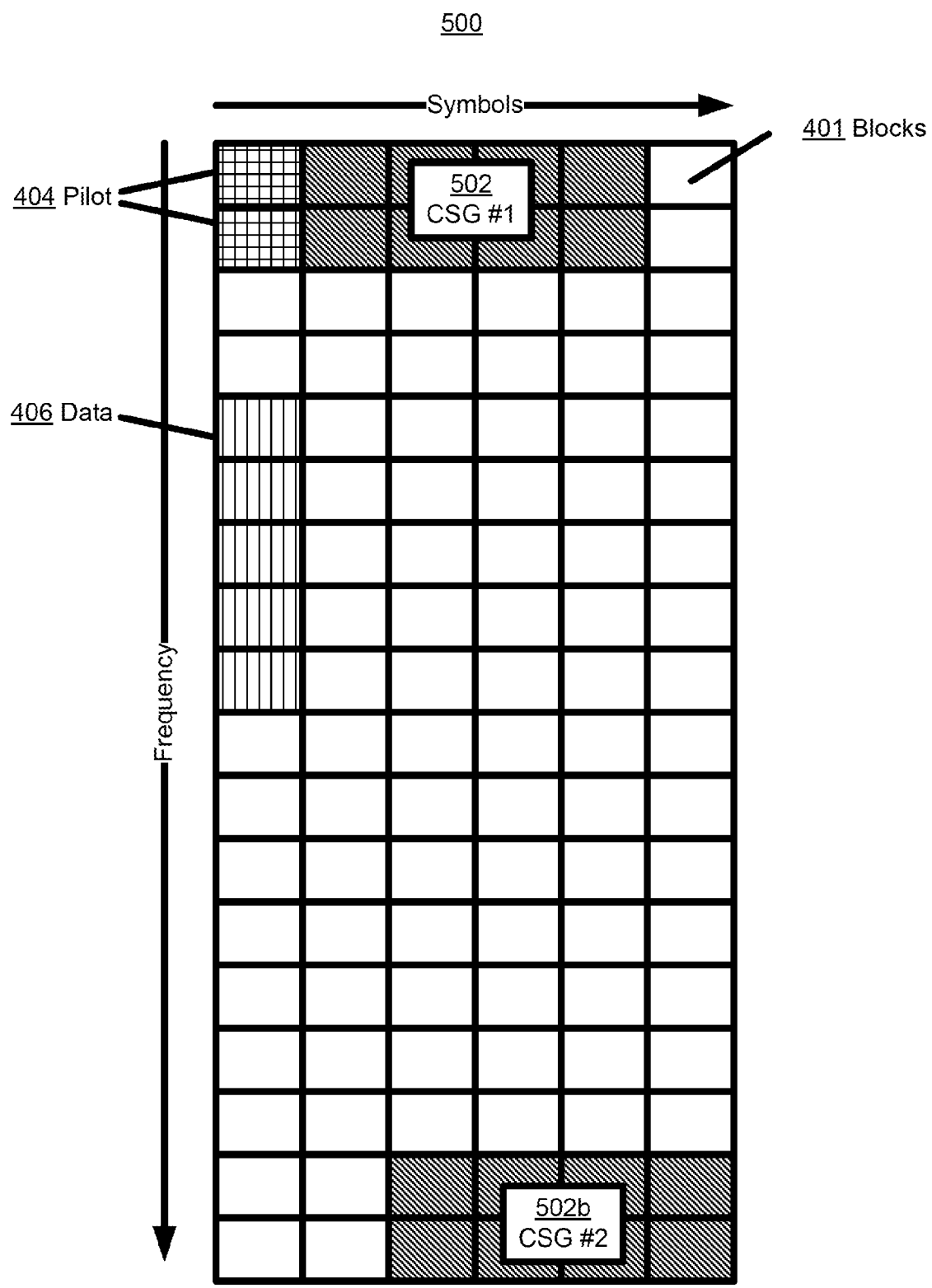
FIG. 5 is a block diagram of another example embodiment of a physical resource unit in accordance with the disclosed subject matter.

FIG. 4 is a block diagram of an example embodiment of a physical resource unit (PRU) 400 in accordance with the disclosed subject matter. In various embodiments, the physical resource unit 400 may be divided both in terms of frequency and time (or symbols). In the illustrated embodiment of PRU 400, the X-axis illustrates division by symbols and the Y-axis illustrates division by frequency or sub-carriers. In various embodiments, the PRU 400 may include a plurality of blocks 401. Please note, that FIGS. 4 and 5 are oriented in such a way that the higher frequencies of the PRU 400 are located at the bottom of the figures; it is understood that this orientation is immaterial and non-limiting to the disclosed subject matter and only a graphic design choice.

In various embodiments, the PRU 400 illustrated may include an Up-Link (UL) PRU. The PRU 400 may include 18 sub-carriers or frequency bandwidth sub-divisions, and 6 symbols or time divisions. In such an embodiment, the PRU 400 may therefore include 108 sub-carriers or blocks. Although, it is understood that the above is merely one illustrative example to which the disclosed subject matter is not limited.

In various embodiments, a portion of the PRU 400 may be allocated to form a plurality of channel sounding groups (CSGs). In the illustrated embodiment, three CSGs may be allocated, CSG 402, CSG 402b, and CSG 402c. In various embodiments, these CSGs 402 may be allocated or created by a controlling device (e.g., a bases station).

In some embodiments, each of these CSGs 402 may include a plurality of contiguous blocks of the PRU. For example, it may be seen in the illustrated embodiment that each CSG 402 includes six blocks 401, three sub-carriers high and two symbols wide (3×2). Although, it is understood that the above is merely one illustrative example to which the disclosed subject matter is not limited.

In this context, because these CSGs 402 include more than one block in length and width, they may be considered to be two-dimensional, having both frequency and time or symbol components. This is contrasted with a block group, such as data 406, which includes only the width of one block or sub-carrier 401, and therefore may be considered one-dimensional, in this context, and only having a frequency component.

Generally, frequency-division multiplexing (FDM) is a form of signal multiplexing where multiple signals are modulated on different frequency carrier waves or sub-carriers. In various embodiments, a CSG 402 may include a plurality of frequency sub-carriers, and, therefore, be said to include FDM. Likewise, code-division multiplexing (CDM) is generally a form of signal multiplexing where multiple codes or symbols are used to modulate a signal. In various embodiments, the CSG 402 may include a plurality of symbol blocks or sub-carriers, and therefore be said to include CDM. In such an embodiment, the two-dimensional CSG 402 may include both FDM and CDM.

In various embodiments, the controlling device (e.g., a bases station) may communicate the CSG 402 allocation to one or more listening devices (e.g., a mobile stations) associated with the controlling device. However, it is understood, that in some embodiments, while a BS may transmit such a signal or message some of the MSs may not, for various reasons (e.g., noise, movement out of range, etc.) receive the signal. This message or signal may, in one embodiment, instruct or cause the MSs to use the allocated CSGs 402 to transmit a channel sounding signal.

In various embodiments, a second message or signal, separate from the allocation message (e.g., a channel quality signal), may be used to trigger or request the transmittal of the channel sounding signal from the MSs. In some embodiments, this channel sounding signal may indicate that each MS may test the channel quality, a respectively experienced, and selectively transmit a channel sounding signal only if the measured channel quality exceeds a certain threshold or criteria. In various embodiments, this signal may include the pilot signal 404. Although, it is understood that the above are merely a few illustrative examples to which the disclosed subject matter is not limited.

In such an embodiment, the plurality of MSs may respond using the CSGs 402. In various embodiments, the MSs may respond using each of the CSGs 402, 402b, and 402c. In some embodiments, the channel sounding signal may include a sounding message including one value for each block of particular CSG (e.g., CSG 402, 402b, and 402c). In various embodiments, this value may be a substantially unique identification code associated with the transmitting MS. In various embodiments, the same channel sounding signal may be transmitted by a MS using all three CSGs 402, 402b, and 402c.

In various embodiments, the BS may use the received channel sounding signals to estimate or determine the quality of the channel used by the PRU 400. In various embodiments, this may include determining a channel quality estimation for each MS.

For example, a first MS (MS #1, e.g., MS 106 of FIG. 1) may transmit its channel sounding signal on all three illustrated CSGs 402, 402b, and 402c. Likewise, a second MS (MS #2, e.g., MS 110 of FIG. 1) may also transmit its channel sounding signal on all three illustrated CSGs 402, 402b, and 402c. However, the BS may receive these signals with various degrees of strength and clarity. In one embodiment, the BS may receive MS #1's channel sounding signal on all three CSGs 402, 402b, and 402c but only receive MS #2's channel sounding signal on CSG 402 and CSG 402c. From this the BS may infer that messages transmitted to MS #2 using the sub-channels comprising CSG 402b may not be received by MS #2. Although, it is understood that the above is merely one illustrative example to which the disclosed subject matter is not limited.

Returning to the above specific example, the BS may be expecting channel sounding signals from three MSs (e.g., MSs 106, 108 and 110 of FIG. 1). If at least one channel sounding signal is received via a CSG (e.g., CSG 402 which was used by both MS #1 and MS #2 of the example above), it may be desirable to determine which MS transmitted the received channel sounding signal.

In various embodiments, the controlling device (e.g., a base station) may assign specific identification codes to each listening device (e.g., a mobile station). In one embodiment, the BS may assign, to each MS or antenna thereof associated with it, a substantially unique identification code. In some embodiments, these substantially unique identification codes may be substantially orthogonal (e.g., a Walsh code, etc.). In such an embodiment, the BS may be able to determine, using the orthogonal codes, which MSs or antennas transmitted the channel sounding signal for each CSG 402. For example, the BS may use the XOR Boolean operation to correlate a received signal with the identification code associated with a given MS or antenna.

In various embodiments, a channel sounding group 402 may include one block (e.g., a code symbol or frequency band) for each mobile station or antenna associated with the allocating or controlling device (e.g., a base station). In such an embodiment, the CSG 402 may include enough symbols to uniquely identify each MS or antenna. For example, a system with six MSs or antennas (e.g., 3 MSs each with 2 antennas) may be uniquely identified via orthogonal identification codes of six bits. In such an embodiment, a 3×2 CSG (e.g., CSG 402, 402b or 402c) would include enough symbols (2 symbols per 3 frequency bands, totaling 6 sub-carriers 401) to fully communicate the assigned identification code. Although, it is understood that the above are merely a few illustrative examples to which the disclosed subject matter is not limited.

In various embodiments, if the number of MSs or antennas associated with a BS changes (e.g., moving in or out of range, etc.), the BS may reassign identification codes and subsequently allocate differently sized CSGs 402. For example, if only 4 MSs exist a CSG may include a 2×2 block (not illustrated). Or, if 8 MSs exist a CSG may include a 4×2 block. Although, it is understood that the above is merely one illustrative example to which the disclosed subject matter is not limited.

In less desirable embodiments, a channel sounding group (CSG) may not be large enough to allow for uniquely identifying all associated MSs or antennas. For example, if seven MSs or antennas exist, the CSG 402 (a 3×2 CSG) would include one less block or sub-carrier 401 (symbol or frequency band) than needed to use Walsh coding to provide orthogonal identification codes. In such an embodiment, the BS may re-assign mostly unique identifiers to each MS or, in one embodiment, the BS may simply accept that the origin of some channel sounding signals may be indeterminate and assign identifiers in such a way as to minimize or manage that possibility. It is understood that in other embodiments, the size of the CSG may be increased to accommodate the extra MSs or antennas.

In various embodiments, the size of the CSGs may be determined by the lowest power of two (e.g., 2, 4, 8, 16, etc.) that may accommodate the MSs or antennas. In another embodiment, the CSGs may be rectangular. In yet another embodiment, the CSGs may be non-rectangular or jagged, as would occur with a two-dimensional CSG of five blocks 401. Although, it is understood that the above are merely a few illustrative examples to which the disclosed subject matter is not limited.

In various embodiments, the MSs may be divided into user groups. In such an embodiment, the BS may allocate CSGs, not to all the MSs associated with BS but to a selected user group. In various embodiments, this may improve the channel estimation accuracy of the physical resource unit. Conversely, in one embodiment, the CSGs within one PRU can be allocated to the multiple user groups, which may increase the sounding users.

In various embodiments, the controlling device (e.g., a bases station) may allocate the number and position (within the PRU) of the CSGs (e.g., CSG 402, 402b, and 402c) to assist channel quality estimation. For example, in various embodiments, frequency selective fading is the phenomenon that channel quality often differs by frequency. Two identical signals, transmitted on different frequencies, may not both be received. In one frequency band the noise or interference may be substantial, while in a second frequency band it may be non-existent, to highlight the phenomenon. Although, it is understood that the above is merely one illustrative example of an affecter of channel quality to which the disclosed subject matter is not limited.

In one embodiment, the BS may allocate a first CSG block (e.g., CSG #1 402) at the lower frequency edge of the PRU. In such an embodiment, the BS may then allocate a second CSG block (e.g., CSG #2 402b) at the upper frequency edge of the PRU. In various embodiments, the PRU may experience above average or even significant frequency selective fading at the edges of the PRU's frequency range. This is often referred to as "frequency roll-off". In such an embodiment, by allocating CSGs to the frequency edges of the PRU 400, a "worst case" estimation of channel quality may be obtained.

In another embodiment, the BS may allocate CSGs 402 and 402b to the edges of the frequency range of the PRU 400, and a third or additional CSG 402c to middle or substantially the middle of the frequency range of the PRU 400. An embodiment with three CSGs (e.g., CSGs 402, 402b and 402c) may produce three separate channel quality data points generally spread across the entire frequency range of the PRU 400. In such an embodiment, the BS may obtain a more accurate estimation of the channel's quality. In various embodiments, additional CSG's may be used. In some embodiments, the BS may allocate CSGs or different sizes; although if substantially orthogonal identification codes are used the benefit of this may not be great.

In various embodiments, as a CSG 402 is made or allocated to be longer in the frequency domain, the value of the information returned by the MS's channel sounding signal may be reduced (relative to shorter frequency-wise CSGs). Each CSG 402 may provide an average channel quality estimation for that CSG. If a 3×2 CSG is used, in one embodiment, three frequency sub-channels may be estimated or averaged together to provide a single data point. In various embodiments, this may be acceptable as the channel quality from a first sub-carrier may be roughly similar to a sub-carrier one frequency block away. But, in various embodiments, the correlation between the channel quality of two sub-channels often decreases as the distance (frequency-wise) from them increase. For example, channel quality of that first sub-carrier may be less similar to a sub-carrier three frequency blocks away, and even less similar to a sub-carrier five blocks away. Therefore, in various embodiments, the BS may allocate CSG blocks within a pre-defined or configurably defined acceptable frequency height.

In various embodiments, the BS may also allocate the CSGs 402 based upon other uses made of the PRU 400. For example, a number of blocks may be unmovable or pre-allocated, such as, pilot blocks 404. In such an embodiment, certain blocks may be pre-allocated or positionally defined by a communications standard or protocol. An example may include the pilot blocks or tones 404 that may, in one embodiment, be used by the BS to transmit the BS's sounding signal which may be used for signal strength measurements, channel response estimation, etc. Although, it is understood that the above are merely a few illustrative examples to which the disclosed subject matter is not limited.

In another embodiment, the BS may also allocate CSGs 402 based upon more configurable users made of the PRU 400. For example, the BS may also allocate data blocks (e.g., data 406). In such an embodiment, the BS may allocate both the data blocks (e.g., data 406) and the CSGs (e.g., CSGs 402, 402b, and 402c) such that interference between the blocks is reduced (e.g., increased spacing), that one type (e.g., data) has priority over the other if a conflict arises (e.g., if both desired data usage and CSG usage would exceed the size of the PRU 400, etc.), etc. Although, it is understood that the above are merely a few illustrative examples to which the disclosed subject matter is not limited.

In various embodiments, once the MS's channel sounding signals have been received via the CSGs 402, the BS may estimate the channel quality of the channel used by the PRU 400. In one embodiment, the BS may compare the received channel sounding signal to an expected channel sounding signal to determine the quality of the received sounding signal and, based upon that, the quality of the channel. In various embodiments, the BS may determine qualities such as, for example, signal-to-noise ratio, a signal-to-interference and noise ratio, received signal strength, or any other channel quality; although, it is understood that the above are merely a few illustrative examples to which the disclosed subject matter is not limited.

In one embodiment, the BS may simply average the channel quality provided via the CSGs 402. In another embodiment, the BS may use a finer level of granularity is estimate the channel quality. In one embodiment, a rough curve or values representing a mathematical equivalent may be formed using the data points provided by the CSGs 402. In another embodiment, a pre-defined or configurable weighting of the data points provided by the CSGs 402 may be used. Although, it is understood that the above are merely a few illustrative examples to which the disclosed subject matter is not limited.

In various embodiments, this channel quality estimation may occur for each MS or antenna. In such an embodiment, the channel quality estimated for a first and a second MS may differ radically. In various embodiments, if an MS estimates the channel quality to be above or certain criteria or threshold, the MS may respond with a channel sounding signal. In such an embodiment, the MS may transmit or broadcast this channel sounding signal on all allocated CSGs (e.g., CSG 402, 402b, and 402c). Although, it is understood that due to channel conditions (e.g., frequency selective fading, etc.) the BS may not receive the MS's channel sounding signal on all of the CSGs, as described above.

In some embodiments, the BS may then allocate data blocks (e.g., data 406) to each MS based upon the estimated channel quality associated with the respective MS. Continuing the example above, the BS may, in one embodiment, attempt to allocate data blocks to the third MS that are in, as much as possible, the middle to lower end of the RPU's 400 frequency range. The BS may, in one embodiment, freely allocate any data blocks to the second MS. While, in one embodiment, the BS may allocate none or little data blocks to the first non-responsive MS. Although, it is understood that the above are merely a few illustrative examples to which the disclosed subject matter is not limited. In various embodiments, the BS may not include the fine level or granularity to position data block allocation within the frequency range based upon individual CSG 402 responses.

FIG. 5 is a block diagram of an example embodiment of a physical resource unit 500 in accordance with the disclosed subject matter. FIG. 5 illustrates an example embodiment mentioned above (in reference to FIG. 4). In such an embodiment, the BS or allocating device may allocate only two CSGs 502 and 502b. In various embodiments, these CSGs 502 and 502b may be allocated at the edge of the RPU's 500 frequency range. Also, FIG. 5 illustrates that the CSGs 502 and 502b need not be limited to a 3×2 configuration but may be allocated in different shapes and orientations (e.g., 2×4, etc.). In such an embodiment, the CSGs 502 and 502b may accommodate up to eight substantially orthogonal identification codes and therefore up to eight MSs or antennas. Although, it is understood that the above are merely a few illustrative examples to which the disclosed subject matter is not limited.

Figure 6:
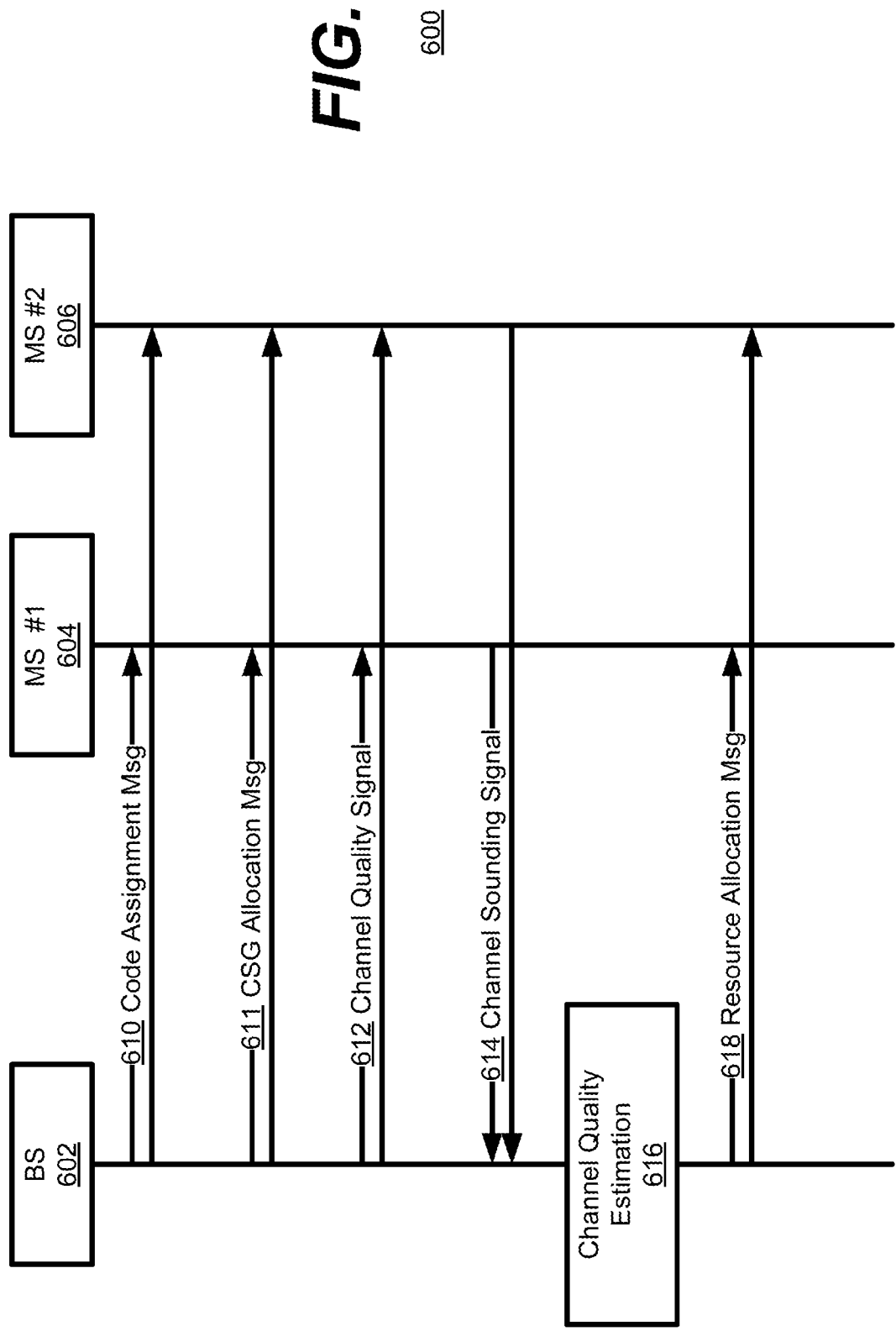
FIG. 6 is a block diagram of an example embodiment of a system in accordance with the disclosed subject matter.

FIG. 6 is a block diagram of an example embodiment of a system 600 in accordance with the disclosed subject matter. In one embodiment, the system 600 may include a BS 602, a first mobile station 604, a second mobile station 606. In various embodiments, the mobile stations may include a first antenna and a second antenna. However, it is understood that the disclosed subject matter is not limited to a fixed number of antennas and that FIG. 6 is merely an illustrative embodiment.

In one embodiment, the BS 602 may establish an association or a connection with at least one mobile station, as described above. In various embodiments, this establishment may include broadcasting a message identifying the BS 602, receiving a message from the respective MSs requesting an association, and authenticating the MS; although, it is understood that the above is merely one illustrative example to which the disclosed subject matter is not limited.

In one embodiment, the BS 602 may broadcast or individually transmit an identification code assignment message 610 to each MS 604 and 606. In various embodiments, this identification code assignment message 610 may include a substantially unique identifier or code to each mobile station (e.g., MSs 604 and 606) or to each antenna of the MSs. In various embodiments, the identification code may be substantially orthogonal with every other MS associated with the BS 602, as described above. In such an embodiment, this code may be used to identify from which MS or antenna a message or signal (e.g., channel sounding signal 614) originates, as described above.

In various embodiments, the code assignment message 610 may include a specific message. In another embodiment, the code assignment message 610 may be included as part of another message (e.g., a MS attachment response message, etc.). In such an embodiment, the code assignment message 610 may include a parameter or element of the other or carrier message. In one such embodiment, the code assignment message 610 may be or include a type-length-value (TLV) element that specifies that it is a parameter or element including the code assignment and a value for the code or codes assignment. A specific embodiment of a substantially uniquely identifiable code assignment is discussed above in reference to FIG. 4. Although, it is understood that the above are merely a few illustrative examples to which the disclosed subject matter is not limited.

In one embodiment, the BS 602 may transmit or broadcast a channel sounding group (CSG) allocation message 611. In various embodiments, the CSG allocation message 611 may include the sub-carrier allocations for the channel sounding groups allocated by the BS 602, as described above. In such an embodiment, the receiving MSs 604 and 606 may then know to transmit their channel sounding signals 614 via the allocated sub-carriers. In various embodiments, the CSG allocation message 611 may be included as part of another resource block allocation message (e.g., including data allocation, etc.) transmitted or broadcast from the BS 602.

In one embodiment, the BS 602 may transmit or broadcast a signal or message, which may be referred to as a channel quality signal 612, to at least one mobile station actively associated with the base station (e.g., MSs 604 and 606). In various embodiments, the channel quality signal 612 may cause or indicate to the receiving MSs 604 and 606 that they should transmit their channel sounding signals 614 during the allocated sub-carriers indicated by the CSG allocation message 611, as described above.

In various embodiments, the CSG allocation message 611 and the channel quality signal 612 may be the same message or signal. For example, the allocation of channel soundings groups (CSGs) within the CSG allocation message 611 may indicate that the receiving MSs should transmit their channel sounding signal, via the allocated CSGs, during the next available uplink period. In such an embodiment, the channel allocation message 611 may act as the channel quality signal 612. In another embodiment, a CSG allocation message 611 may only be transmitted when the CSGs are first allocated or changed. The CSGs sub-carriers, in such an embodiment, may be remembered by the MSs 604 and 606 and used when a channel quality signal 612 is received. Although, it is understood that the above are merely a few illustrative examples to which the disclosed subject matter is not limited.

In various embodiments, the BS 602 may transmit a channel quality signal 612 opportunistically. In another embodiment, the BS 602 may transmit a channel quality signal 612 periodically or, in one embodiment, as part of every frame. In various embodiments in which the channel quality signal 612 is transmitted opportunistically, the BS 602 may monitor or accumulate data regarding the communications channel conditions (e.g., number of resend requests, number of MSs, channel quality experienced by the BS 602, etc.). In such an embodiment, the BS 602 may broadcast a channel quality signal 612 when it is determined that the communications channel condition has fallen below an acceptable standard or threshold. In various embodiments, this standard or threshold may be predetermined, configurable, or dynamically adjustable, etc. In various embodiments, this standard or threshold may be a relative (versus absolute) standard (e.g., a rate of change of the communications channel's condition, etc.).

In various embodiments, the opportunistic unsolicited transmission of the channel quality signal 612 may reduce the overall overhead of MIMO feedback (e.g., as compared to non-opportunistic schemes). In some embodiments, the periodic or opportunistic unsolicited transmission of the channel quality signal 612 may reduce the power requirements or drain experienced by the MSs (e.g., due to the reduced channel sounding signals 614).

In some embodiments, each MS 604 and 606 may transmit a channel sounding signal 614 to the BS 602 via the allocated CSGs (as indicated by CSG allocation message 611). As described above, in various embodiments, each MS may transmit its identification code, as received by the code assignment message 610. In an example embodiment, each MS (or antenna) may be assigned a unique code, such as a different orthogonal Code Division Multiple Access (CDMA) code via code assignment message 610. Each MS (or each antenna in a multiple antenna embodiment) may encode its channel sounding signal 614 using the orthogonal CDMA code assigned to the MS, as described above.

In various embodiments, the BS 602 may perform channel quality estimation, as illustrated by Block 616. As described above, in various embodiments, the BS 602 may, for each CSG, determine which if the MSs 604 and 606 transmitted any received channel sounding signals 614. In various embodiments, it may make this determination using the assigned MS identification codes.

As described above, in various embodiments, the BS 602 may compare the received channel sounding signals 614 to an expected channel sounding signal. Using this comparison, the BS 602 may determine channel quality characteristics, for each MS 404 and 406 associated with the BS 602 as described above.

In various embodiments, the BS 602 may use the determined individual MS channel quality estimates to allocate resources to the MS or antennas (e.g., MSs 604 and 606), as described above. In various embodiments, the BS 602 may assume that channel quality in the uplink (UL) direction correlates well with the channel quality in the downlink (DL) direction, and allocate both DL and UL resources. In one embodiment, resource allocation message 616 may include physical resource unit or sub-carrier allocation to specific MSs (e.g., MSs 604 and 606). In various embodiments, the resource allocation message 616 may be of the same type or form as the CSG allocation message 611.

Figure 7:
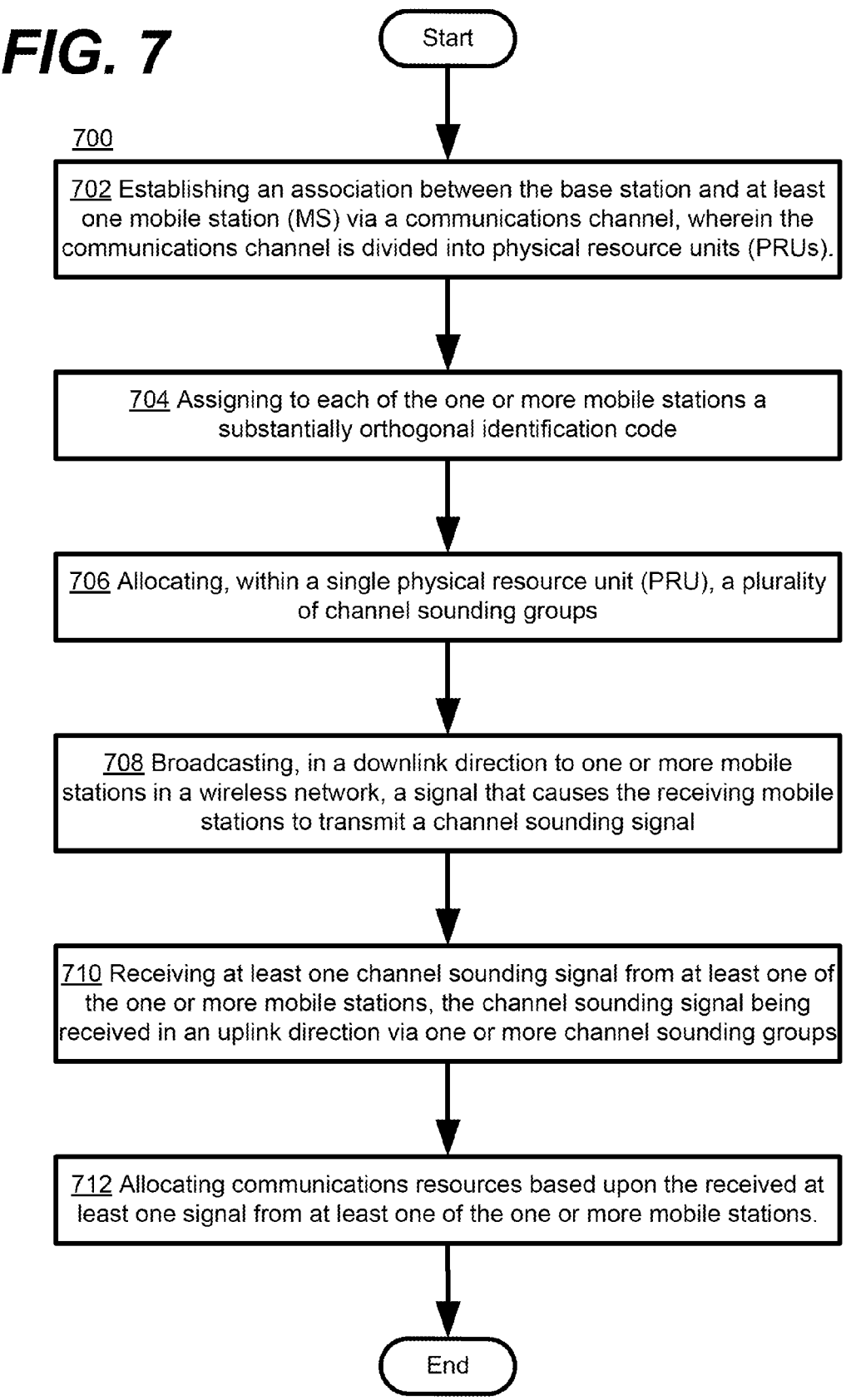
FIG. 7 is a flow chart of an example embodiment of a technique in accordance with the disclosed subject matter.

FIG. 7 is a flow chart of an example embodiment of a technique 700 in accordance with the disclosed subject matter.

Block 702 illustrates that, in one embodiment, an association between the base station and at least one mobile station (MS) may be established via a communications channel, wherein the communications channel is divided into physical resource units (PRUs), as described above. In various embodiments, establishing may include actions or steps taken by a base station. In some embodiments, steps or actions taken by a mobile station or other device may be outside the scope of the actions illustrated by Block 702; although, it is understood such mobile station or other device actions may be the cause or effects of establishment actions taken by a base station or apparatus employing the described technique. In various embodiments, the action(s) described above may be performed by one or more of the following: a base station 104 of FIG. 1, a transceiver 202 of FIG. 2, or a base station 602 of FIG. 6, as described above.

Block 704 illustrates that, in one embodiment, a substantially orthogonal identification code may be assigned to each of the one or more mobile stations, as described above. In some embodiments, assigning may include transmitting the identification code to the mobile stations. In various embodiments, the action(s) described above may be performed by one or more of the following: a base station 104 of FIG. 1, the transceiver 202 or controller 204 of FIG. 2, or a base station 602 of FIG. 6, as described above.

Block 706 illustrates that, in one embodiment, a plurality of channel sounding groups (CSGs) may be allocated, within a single physical resource unit (PRU), as described above. In various embodiments, the CSGs may include both a frequency division multiplexing (FDM) allocation and a code division multiplexing (CDM) allocation, as described above. In another embodiment, allocating may include allocating, for each channel sounding group, a contiguous two-dimensional block of the physical resource unit, as described above. In yet another embodiment, allocating may include allocating to the channel sounding group either one code symbol or one frequency band for each mobile station associated with an allocating device, as described above. In further embodiments, allocating may also include allocating a first channel sounding group at a lower frequency edge of the PRU, and allocating a second channel sounding group at an upper frequency edge of the PRU, as described above. In some embodiments, allocating may also include allocating a third channel sounding group substantially in the middle of the frequency range of the PRU, as described above. In one embodiment, allocating may include increasing channel quality estimation accuracy by allocating channel sounding groups to compensate for frequency selective fading, as described above. In various embodiments, allocating may include transmitting the allocation to one or more mobile stations, as described above. In various embodiments, the action(s) described above may be performed by one or more of the following: a base station 104 of FIG. 1, the transceiver 202 or controller 204 of FIG. 2, or a base station 602 of FIG. 6, as described above.

Block 708 illustrates that, in one embodiment, a signal may be broadcast, in a downlink direction to one or more mobile stations in a wireless network. Wherein the causes the receiving mobile stations to transmit a channel sounding signal, as described above. In various embodiments, broadcasting may include transmitting a message that indicates the channel sounding groups allocation, as described above. In various embodiments, the action(s) described above may be performed by one or more of the following: a base station 104 of FIG. 1, the transceiver 202 of FIG. 2, or a base station 602 of FIG. 6, as described above.

Block 710 illustrates that, in one embodiment, at least one channel sounding signal from at least one of the one or more mobile stations, may be received, as described above. In various embodiments, the channel sounding signal may be received in an uplink direction via one or more channel sounding groups, as described above. In some embodiments, the received signal may include a sounding signal encoded by a Code Division Multiple Access (CDMA) signal to provide a CDMA encoded sounding signal, as described above. In another embodiment, receiving may include receiving the assigned orthogonal identification code assigned to the transmitting respective mobile station, as described above. In various embodiments, the action(s) described above may be performed by one or more of the following: a base station 104 of FIG. 1, the transceiver 202 of FIG. 2, or a base station 602 of FIG. 6, as described above.

Block 712 illustrates that, in one embodiment, communications resources may be allocated based upon the received at least one signal from at least one of the one or more mobile stations, as described above. In some embodiments, allocating may include transmitting or broadcasting the allocation to one or more mobile stations. In various embodiments, the action(s) described above may be performed by one or more of the following: a base station 104 of FIG. 1, the transceiver 202 or controller 204 of FIG. 2, or a base station 602 of FIG. 6, as described above.

FIG. 8 is a flow chart of an example embodiment of a technique 800 in accordance with the disclosed subject matter.

Block 802 illustrates that, in one embodiment, an identification code may be received, in a downlink direction, as described above. In various embodiments, the identification code may identify the receiving apparatus in a manner that is substantially orthogonal and substantially unique compared to other assigned identification codes, as described above. In various embodiments, the action(s) described above may be performed by one or more of the following: the mobile stations 106, 108, or 110 of FIG. 1, the transceiver 202, memory 206, or identifier 210 of FIG. 2, or the mobile station 604 or 606 of FIG. 6, as described above.

Block 804 illustrates that, in one embodiment, an allocation, within a single physical resource unit (PRU), of a plurality of channel sounding groups may be received, in a downlink direction, as described above. In various embodiments, each channel sounding group may include both a frequency division multiplexing (FDM) allocation and a code division multiplexing (CDM) allocation, as described above. In some embodiments, channel sounding group may include a contiguous two-dimensional block of the physical resource unit, as described above. In various embodiments, the action(s) described above may be performed by one or more of the following: the mobile stations 106, 108, or 110 of FIG. 1, the transceiver 202 of FIG. 2, or the mobile station 604 or 606 of FIG. 6, as described above.

Block 806 illustrates that, in one embodiment, a channel sounding signal may be broadcast or transmitted in an uplink direction via one or more channel sounding groups, as described above. In various embodiments, the channel sounding signal may include the received identification code, as described above. In various embodiments, the action(s) described above may be performed by one or more of the following: the mobile stations 106, 108, or 110 of FIG. 1, the transceiver 202 of FIG. 2, or the mobile station 604 or 606 of FIG. 6, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   allocating, within a single physical resource unit (PRU), a plurality of channel sounding groups, at least one of the channel sounding croups being allocated to mobile stations of a first user group of a plurality of user groups, wherein each channel sounding group includes both a frequency-time domain allocation and a code division multiplexing (CDM) allocation;
   wherein at least one of the channel sounding croups allocated to the first user croup for channel sounding are in an upper frequency edge and lower frequency edge of the PRU;
   wherein the CDM allocation contains a unique identifier code for a mobile station or for a specific antenna on one or more mobile stations assigned by the base station;
   monitoring a communication channel condition for one or more communication channels;
   conditionally broadcasting, in a downlink direction to the one or more mobile stations in a wireless network, including the mobile stations of the first user group, if the communication channel condition of one or more of the communication channels is below a threshold, a signal that causes one or more of the receiving mobile stations to transmit a channel sounding signal if channel quality, as measured by the receiving mobile station, is above a criteria;
   receiving at least one channel sounding signal from at least one of the one or more mobile stations of the first user group, the channel sounding signal being received in an uplink direction via one or more channel sounding groups allocated to the mobile stations of the first user group; and
   estimating the channel quality, of the channel used by the physical resource unit, based upon the received at least one channel sounding signal.

2. The method of claim 1 wherein the received signal comprises a sounding signal encoded by a Code Division Multiple Access (CDMA) signal to provide a CDMA encoded sounding signal.

3. The method of claim 1 wherein the allocating includes allocating, for each channel sounding group, a contiguous two-dimensional block of the physical resource unit.

4. The method of claim 1 wherein the allocating includes allocating to the channel sounding group a sub-carrier for each mobile station associated with an allocating device.

5. The method of claim 1, wherein the allocating includes:
   allocating a third channel sounding group in a middle of the frequency range of the PRU.

6. The method of claim 1 further including:
   allocating communications resources based upon the received at least one signal from at least one of the one or more mobile stations.

7. The method of claim 1 wherein the broadcasting includes:
   transmitting a message that indicates the channel sounding groups allocation.

8. The method of claim 1 wherein the allocating includes:
   allocating the channel sounding groups to a selected portion of the one or more mobile stations forming a user group; and
   wherein the conditionally broadcasting includes:
   broadcasting a signal that causes only the mobile station(s) of the selected user group to transmit a channel sounding signal.

9. The method of claim 1 further including:
   assigning to each of the one or more mobile stations an orthogonal identification code; and
   wherein receiving at least one signal from at least one of the one or more mobile stations includes receiving the assigned orthogonal identification code assigned to the respective transmitting mobile station.

10. The method of claim 1 wherein the allocating includes:
    increasing channel quality estimation accuracy by allocating channel sounding groups including a contiguous two-dimensional block of the physical resource unit to compensate for frequency selective fading.

11. The method of claim 1 wherein the allocated channel sounding groups are of different sizes.

12. The method of claim 1 wherein the allocating of channel sounding groups and the broadcasting the signal are provided within one transmitted message.

13. The method of claim 1 wherein the unique identifier code is selected from at least one of a type-length-value code assignment message, an attachment response message, and an orthogonal Walsh code.

14. The method of claim 1 and further comprising:
performing a second allocation, based on the received channel sounding signal of the mobile stations of the first user group and the estimated channel quality, of a data block to mobile stations of the first user group.

15. An apparatus comprising:
a transceiver; and
a controller;
wherein the apparatus is configured to:
allocate, within a single physical resource unit (PRU), a plurality of channel sounding groups, at least one of the channel sounding croups being allocated to mobile stations of a first user group of a plurality of user groups,
wherein each channel sounding group includes a frequency-time domain allocation and a code domain allocation;
wherein at least one of the channel sounding croups allocated to the first user croup for channel sounding are in an upper frequency edge and lower frequency edge of the PRU;
wherein the CDM allocation contains a unique identifier code for a mobile station or for a specific antenna on one or more mobile stations assigned by the base station;
monitor a communication channel condition for one or more communication channel;
conditionally broadcast, in a downlink direction to the one or more mobile stations in a wireless network, including the mobile stations of the first user group, if the communication channel condition of one or more of the communication channels is below a threshold, a signal that causes one or more of the receiving mobile stations to transmit a channel sounding signal if channel quality, as measured by the receiving mobile station, is above a criteria;
receive at least one channel sounding signal from at least one of the one or more mobile stations of the first user group, the channel sounding signal being received in an uplink direction via one or more channel sounding groups allocated to the mobile stations of the first user group; and
estimate the channel quality, of the channel used by the entire physical resource unit, based upon the received at least one channel sounding signal.

16. The apparatus of claim 15 wherein the apparatus is configured to allocate, for each channel sounding group, a contiguous two-dimensional block of the physical resource unit.

17. The apparatus of claim 15 wherein the apparatus is configured to allocate to the channel sounding group either one code symbol or one frequency band for each mobile station associated with an allocating device.

18. The apparatus of claim 15 wherein the apparatus is configured to allocate:
a first channel sounding group at a lower frequency edge of the PRU;
a second channel sounding group at a higher frequency edge of the PRU; and
a third channel sounding group in a middle of a frequency range of the PRU.

19. The apparatus of claim 15 wherein the apparatus is configured to allocate communications resources based upon the received at least one signal from at least one of the one or more mobile stations.

20. The apparatus of claim 15, wherein the apparatus is configured to:
assign to each of the one or more mobile stations an orthogonal identification code; and
receive, as part of the channel sounding signal, the assigned orthogonal identification code assigned to the respective transmitting mobile station.

* * * * *

UNITED STATES PATENT AND TRADEMARK OFFICE
CERTIFICATE OF CORRECTION

PATENT NO. : 8,902,874 B2  Page 1 of 1
APPLICATION NO. : 13/125103
DATED : December 2, 2014
INVENTOR(S) : Joon Hwa Chun et al.

It is certified that error appears in the above-identified patent and that said Letters Patent is hereby corrected as shown below:

In the Claims

In column 15, line 55, in claim 1, delete "croups" and insert -- groups --, therefor.
In column 15, line 60, in claim 1, delete "croups" and insert -- groups --, therefor.
In column 15, line 61, in claim 1, delete "croup" and insert -- group --, therefor.
In column 17, line 15, in claim 15, delete "croups" and insert -- groups --, therefor.
In column 17, line 20, in claim 15, delete "croups" and insert -- groups --, therefor.
In column 17, line 21, in claim 15, delete "croup" and insert -- group --, therefor.

Signed and Sealed this
Fourth Day of August, 2015

Michelle K. Lee
*Director of the United States Patent and Trademark Office*